United States Patent
Perez Gesteira et al.

(10) Patent No.: US 9,919,461 B2
(45) Date of Patent: Mar. 20, 2018

(54) USE OF POLYAMIDE FOR THE PREPARATION OF INJECTION-MOLDED ARTICLES AND RESULTING ARTICLES

(75) Inventors: Gisela Perez Gesteira, São Paulo (BR); Olivier Chaubet, Lyons (FR); Thomas Canova, São Paulo (BR); Guainumbi Medeiros, Lyons (FR); Suzana Kupidlowski, São Paulo (BR)

(73) Assignee: RHODIA POLIAMIDA E ESPECIALIDADES LTDA, Sao Paulo (BR)

( * ) Notice: Subject to any disclaimer, the term of this patent is extended or adjusted under 35 U.S.C. 154(b) by 374 days.

(21) Appl. No.: 13/635,270

(22) PCT Filed: Mar. 22, 2011

(86) PCT No.: PCT/IB2011/000601
§ 371 (c)(1),
(2), (4) Date: Nov. 27, 2012

(87) PCT Pub. No.: WO2011/117709
PCT Pub. Date: Sep. 29, 2011

(65) Prior Publication Data
US 2013/0193614 A1  Aug. 1, 2013

(30) Foreign Application Priority Data
Mar. 22, 2010  (FR) ..................... 10 52040

(51) Int. Cl.
| | |
|---|---|
| B29C 45/00 | (2006.01) |
| B29B 9/12 | (2006.01) |
| C08G 69/16 | (2006.01) |
| C08G 69/28 | (2006.01) |
| C08J 3/20 | (2006.01) |
| C08L 77/02 | (2006.01) |
| C08L 77/06 | (2006.01) |
| C08K 5/00 | (2006.01) |
| B29K 77/00 | (2006.01) |
| C08K 5/01 | (2006.01) |
| C08K 5/09 | (2006.01) |
| C08K 5/098 | (2006.01) |

(52) U.S. Cl.
CPC ............ *B29C 45/0001* (2013.01); *B29B 9/12* (2013.01); *C08G 69/16* (2013.01); *C08G 69/28* (2013.01); *C08J 3/201* (2013.01); *C08K 5/0016* (2013.01); *C08L 77/02* (2013.01); *C08L 77/06* (2013.01); *B29K 2077/00* (2013.01); *C08J 2377/02* (2013.01); *C08J 2377/06* (2013.01); *C08K 5/01* (2013.01); *C08K 5/09* (2013.01); *C08K 5/098* (2013.01)

(58) Field of Classification Search
None
See application file for complete search history.

(56) References Cited

U.S. PATENT DOCUMENTS

| | | | |
|---|---|---|---|
| 2,948,698 A | 8/1960 | Cocci | |
| 3,252,905 A | 5/1966 | Schaeffer | |
| 4,436,898 A * | 3/1984 | Hofmann | C08G 69/00 524/606 |
| 6,515,058 B1 | 2/2003 | Tomiyama et al. | |
| 8,853,310 B2 | 10/2014 | Gesteira et al. | |
| 2006/0247331 A1* | 11/2006 | Coffey et al. | 523/351 |
| 2007/0249789 A1* | 10/2007 | Buehler et al. | 525/420 |
| 2011/0319562 A1 | 12/2011 | Gesteira et al. | |

FOREIGN PATENT DOCUMENTS

| | | |
|---|---|---|
| WO | 2007/109042 A1 | 9/2007 |
| WO | 2010/070409 A1 | 12/2009 |
| WO | 2010/070409 A1 | 6/2010 |

OTHER PUBLICATIONS

International Search Report dated Nov. 2, 2011, by the European Patent Office as the International Searching Authority in International Patent Application PCT/IB2011/000601.

* cited by examiner

*Primary Examiner* — Benjamin A Schiffman
(74) *Attorney, Agent, or Firm* — Osha Liang LLP

(57) ABSTRACT

The use of thermoplastic polymers for the preparation of injection-molded articles and the resulting articles are described. Also described, is the use of a lubricated polyamide, obtained by means of the addition of at least one lubricant during the polyamide polymerization method, for the preparation of injection-molded articles.

23 Claims, No Drawings

USE OF POLYAMIDE FOR THE PREPARATION OF INJECTION-MOLDED ARTICLES AND RESULTING ARTICLES

CROSS-REFERENCE TO PRIOR APPLICATIONS

This application is a National Stage of PCT/IB2011/000601, filed Mar. 22, 2011, and designating the United States (published in French on Sep. 29, 2011, as WO 2011/117709 A2; the title and abstract were published in English), which claims priority to FR 10 52040, filed Mar. 22, 2010, each hereby expressly incorporated by reference in its entirety and each assigned to the assignee hereof.

The invention relates to the use of thermoplastic polymers for the preparation of injection-molded articles and to the molded articles thus obtained. The invention relates more particularly to the use, for the preparation of injected-molded articles, of a lubricated thermoplastic polymer, in particular a lubricated polyamide, obtained by addition of at least one lubricant during the process for the polymerization of the polymer.

PRIOR ART

Thermoplastic polymers, in particular polyamides, are polymers of great industrial and commercial interest. Thermoplastic polyamides in particular are obtained either by reaction between two different monomers or by polycondensation of just one monomer. The invention applies, first, to polyamides resulting from two different monomers, the most important polyamide of which is poly(hexamethylene adipamide). The invention applies, secondly, to polyamides resulting from just one monomer, the most important polyamide of which is polycaprolactam. The manufacture of polymers, in particular of polyamide type, is mainly carried out by polycondensation starting from the monomers, generally by heating an aqueous solution of the monomers at high temperature and high pressure. The polymers thus manufactured, in particular polyamides, mainly in the molten form, are subsequently generally formed into granules. These granules are subsequently used in a great number of applications, in particular for the manufacture of yarns, fibers or filaments, or for the forming of articles by molding, injection molding or extrusion. They can in particular be used in the field of industrial plastics, generally after a formulation stage. These granules, in order to be definitively formed into articles, such as molded articles, and the like, and in order to be formulated, are generally remelted.

The injection-molding stage has to be carried out under conditions which make possible the preparation of articles of varied and more or less complex shapes, in particular with good fluidity of the polymer at the injection-molding temperature. This is particularly important for the preparation of thin articles. Furthermore, the polymers have to confer satisfactory mechanical properties on the molded articles thus obtained. These mechanical properties are in particular the impact strength, the flexural or tensile modulus, or the flexural or tensile breaking stress, inter alia.

It is known from the prior art to modify the properties of polymers by addition of fillers or additives. Use may in particular be made of reinforcing fillers to enhance the mechanical properties, such as mentioned above.

Furthermore, a search is underway to obtain polymer formulations exhibiting a melt flow or a rheological behavior compatible with some forming processes, such as injection molding. This is because these polymer compositions have to be sufficiently fluid in the molten state to be able to be easily and rapidly conveyed and handled in certain forming devices, such as, for example, injection molding, and to make it possible to produce articles of varied and more or less complex shapes. In order to do this, the operation is generally carried out at a high injection temperature, which causes problems of decomposition of the polymer and results in high energy costs.

Furthermore, it is essential, for the injection molding application, to have available a lubricated polymer, in order to favor the injection process and the removal from the mold and thus to increase the productivity.

It is known to add a lubricant to the polymer, in particular to the polyamide, it being possible for this lubricant to be itself a mixture comprising several lubricants. These lubricants are conventionally deposited and dispersed around the polymer granules. The granules are subsequently remelted in order to be formed. These lubricants are also sometimes introduced during a formulation stage, by remelting polymer granules and adding the lubricant to the molten polymer. These methods are complex and involve additional stages of remelting of the polymer or of deposition of the lubricant on the granules, which results in considerable costs. It can thus prove to be simpler and more economical to introduce the lubricants during the process of polymerization of the polymer.

There thus exists a constant need to operate under conditions which make it possible to have a good compromise between the ability to process the formulations during the injection molding and the good mechanical properties of the articles obtained.

INVENTION

To this end, the invention provides for the use of a lubricated polyamide for the preparation of articles by injection molding, characterized in that:
  the polyamide is a polyamide of 6 or 66 type and exhibits a viscosity index, measured according to the standard ISO307, of between 95 and 125 ml/g;
  the polyamide is manufactured by a polymerization process comprising a phase of distillation under pressure, a decompression phase, a finishing phase and a granulation phase;
  a lubricant, and optionally a chain-limiting agent, is introduced during the process for the polymerization of the polyamide, in the following way:
  when a chain-limiting agent is introduced during the process for the polymerization of the polyamide, said chain-limiting agent is introduced before the end of the finishing stage,
  when no chain-limiting agent is introduced during the process for the polymerization of the polyamide, the lubricant is introduced before the end of the finishing stage, and
  the lubricant is introduced after the phase of distillation under pressure.

The use according to the invention thus makes it possible to prepare injection-molded articles which exhibit satisfactory mechanical properties, which result from lubricated polyamides making possible the preparation of articles of more or less complex shapes, this being done under milder injection-molding temperature conditions. Such temperature conditions make it possible in particular to save on energy and to reduce the decomposition of the polyamide. In addition, the use according to the invention makes it possible to reduce the cycle times necessary for the manufacture of the molded articles and thus to increase the productivity of the plant.

Thus, according to the invention, the lubricated polyamide is obtained in a simple and economical way. This is because there is no additional stage of deposition of lubricant on the granules. The polyamide granules obtained according to the process of the invention are already lubricated and they can be formulated and/or formed directly, without an additional lubrication stage. This represents a considerable advantage.

The invention additionally makes it possible to prepare injection-molded articles resulting from lubricated polyamides which exhibit satisfactory mechanical properties, which is reflected in particular by high nonbreaking levels for the application in the field of cable ties. The invention also makes it possible to prepare articles of more or less complex shapes, this being achieved under milder injection-molding temperature conditions. Such temperature conditions make it possible in particular to save on energy and to reduce the decomposition of the polyamide. In addition, the invention makes it possible to benefit from the chain-limiting effect of some lubricants, which all the more simplifies the preparation of the polyamide. The use according to the invention also makes it possible to reduce the cycle times necessary for the manufacture of the molded articles and thus to increase the productivity of the plant.

Moreover, the lubricant can be introduced late, during the polymerization process, which makes it possible to retain great flexibility in the polymerization unit: this is because the late addition of the lubricant makes it possible to continue to produce a large number of different polyamide grades, for example with or without lubricant, in one and the same polymerization unit. Early introduction of the lubricant might result in contamination of the plants during changes in polyamide grade to be produced, which is not desirable. Finally, the lubricant introduced late makes it possible to limit interference with the polymerization process.

Polymerization

The use according to the invention can employ all types of polyamides or copolymers based on polyamide 6 or 66. It is, for example, effective for polyamides resulting from the polymerization of caprolactam or 6-aminohexanoic acid or for polyamides resulting from the polymerization between adipic acid and hexamethylenediamine. It is suitable for any polyamide-based composition and any polyamide-based copolymer.

The standard ISO307 defines the protocol for measuring the viscosity index, according to the measurement of the flow times, at 25° C., of a polyamide solution. When the polyamide is a polyamide 66 or 6, a solution with a content by weight of 5 g/l in 90% formic acid is prepared. Advantageously, the viscosity index according to the standard ISO307, in particular for polyamides 66 or 6 in 90% formic acid, is between 105 and 125 mg/ml, preferably between 110 and 122 ml/g.

The polyamide can be in the form of a polyamide-based composition as matrix and comprising additives, such as anti-foaming agents, and the like. These additives are known to a person skilled in the art. The composition can also comprise other compounds, such as mattifying agents, for example titanium dioxide or zinc sulfide, heat and/or light stabilizers, bioactive agents or soil-release agents. This list does not have any exhaustive nature.

The polymerizations starting from dicarboxylic acid monomers and diamine monomers generally comprise three stages. The first stage is the concentrating of a di(ammonium carboxylate) salt in water, known as "N salt". This stage is followed by an amidation, which is a condensation of the acid and amine functional groups, generally comprising the following phases: a phase of distillation under pressure and a decompression phase. The condensation is subsequently continued at atmospheric pressure or under vacuum, until the desired degree of polymerization is achieved. This stage is referred to as the finishing stage. The polyamide is generally subsequently extruded and then granulated in a granulation phase.

The polymerizations starting from lactams and amino acids, in particular the manufacture of polyamide 6, can comprise a stage of mixing the monomers with water, a heating stage, optionally a stage of increasing the pressure followed by a decompression stage, optionally a stage of finishing under vacuum, generally a stage of granulation of the product obtained, an extraction stage and a drying stage.

According to a first embodiment of the invention, the lubricant does not comprise fatty acids or fatty acid metal salts as defined above as exhibiting a chain-limiting effect. In this first embodiment, a chain-limiting agent as defined above is introduced during the process for the polymerization of the polyamide.

According to a second embodiment of the invention, the lubricant comprises at least one fatty acid and/or fatty acid metal salt as defined above as exhibiting a chain-limiting effect. In this second embodiment, a chain-limiting agent as defined above can be introduced during the process for the polymerization of the polyamide.

According to the first embodiment of the invention, where the lubricant does not comprise fatty acids or fatty acid metal salts as defined above as exhibiting a chain-limiting effect and where a chain-limiting agent as defined above is introduced during the polymerization process, the chain-limiting agent is introduced before the granulation.

According to the second embodiment of the invention, the lubricant comprises at least one fatty acid and/or fatty acid metal salt as defined above as exhibiting a chain-limiting effect, and a chain-limiting agent is optionally added. If no chain-limiting agent is added, then the lubricant exhibiting a chain-limiting effect or at least the constituent exhibiting a chain-limiting effect is introduced before the granulation. If a chain-limiting agent is added, then the chain-limiting agent is introduced between before the beginning of the stage of concentrating the "N salt", for polyamide 66, or the stage of mixing the monomers with water, for polyamide 6, and before the granulation.

According to a preferred embodiment of the invention, the lubricant and the chain-limiting agent are introduced before the granulation.

The process comprises a finishing stage and, in this case, the definition given above for "before the granulation" corresponds to "before the end of the finishing stage".

The term "before the granulation" is understood to mean at least 3 minutes, preferably at least 10 minutes, before the polyamide is subjected to the granulation; and at the latest 15 minutes before the polyamide is subjected to the granulation.

According to a specific embodiment of the invention, the lubricated polyamide is obtained by a process comprising a polycondensation carried out in the molten phase comprising the N salt solution or the liquid comprising the monomers, the reaction stream flowing at low speed in the lower part of a horizontal-axis reactor or in a tubular device. The polycondensation reaction is thus carried out at a pressure of approximately 5-30 bar at a temperature of approximately 215-300° C. The reaction stream is subsequently subjected to a nonadiabatic decrease in pressure down to atmospheric pressure by passing through a flasher, that is to say a heated tubular device exhibiting a sufficient exchange surface area to prevent the product from crystallizing. During this operation, residual water present in the material stream is evaporated. The vapor and the liquid stream can subsequently be separated in a gas/liquid separator. The polycondensation is continued in the molten phase at atmospheric or reduced pressure, so as to achieve the desired degree of progression, in a finisher. The residence time in the finishing device in the liquid phase is preferably greater than or equal to 5 minutes, preferably greater than or equal to 10 minutes and more preferably still greater than or equal to 15 minutes.

The various constituents of the mixture of lubricants and optionally the chain-limiting agents can each be introduced separately at different stages during the process for the polymerization of the polyamide or simultaneously during the process for the polymerization of the polyamide. Preferably, the various constituents of the mixture of lubricants are introduced simultaneously during the process for the polymerization of the polyamide.

If a chain-limiting agent is introduced, it will be introduced between before the beginning of the stage of concentrating the "N salt", for polyamide 66, or the stage of mixing the monomers with water, for polyamide 6, and the end of the finishing stage; preferably, the chain-limiting agent is introduced before or during the stage of concentrating the "N salt", for polyamide 66, or during the stage of mixing the monomers with water, for polyamide 6.

The process comprises a phase of distillation under pressure and a decompression phase; the lubricant is introduced after the phase of distillation under pressure, preferably after the decompression phase.

The process for the polymerization of the polyamide can be continuous or batchwise. Preferably, it is a continuous process.

In the case of a continuous process, the decompression phase is carried out by passing through a flasher, and the lubricant can be introduced at the inlet of the flasher. The term "at the inlet of the flasher" signifies, within the meaning of the present invention, that the introduction is carried out at the beginning of the stage of decompression by passing through the flasher.

According to an advantageous embodiment of the process of the invention, the lubricant is preferably introduced between the beginning and the end of the finishing stage.

Mixing means can be used during the implementation of the invention. These means are known to a person skilled in the art.

Advantageously, the polyamide was not subjected to a remelting stage when the lubricant and optionally the chain-limiting agent is (are) introduced.

Lubricant

Use may be made of a lubricant or a mixture of lubricants as described above. It will be understood, within the meaning of the present invention, that the term "a lubricant" or "the lubricant" can be the lubricant alone, one of the constituents of the mixture of lubricants or the mixture of lubricants. The term "lubricant" is understood to mean a compound well-known in the industrial field of polyamides and explained in particular on page 439 of the Nylon Plastics Handbook, M. I. Kohan, Hanser Publishers, 1995.

The lubricant can be a paraffin. The paraffins are in the form of pure substances or of industrial mixtures. They can be oils of hydrocarbons or waxes. They are generally saturated or unsaturated aliphatic hydrocarbon compounds. Advantageously, the lubricant is a paraffin, the mean number of carbon atoms of which is between 8 and 100, preferably between 12 and 80 and advantageously between 15 and 50.

The lubricant can also be chosen from fatty acids, fatty acid metal salts, fatty acid esters, fatty acid amides and their mixtures. These compounds can be saturated or unsaturated. Mention may be made, as fatty acids which may be suitable in the context of the invention, of fatty acids comprising at least 16 carbon atoms. Mention may be made, as examples of such fatty acids, of lauric acid, myristic acid, palmitic acid, stearic acid, alginic acid, behenic acid, lignoceric acid, serotinic acid, melissic acid or eicosanoic acid. Stearic acid is preferred. The fatty acids are advantageously mono- or divalent carboxylic acids having from 6 to 24 carbon atoms. Mention may be made, among these divalent acids, of pelargonic acid, margaric acid or dodecanedicarboxylic acid.

The choice will preferably be made, as fatty acid metal salt in accordance with the invention, of the fatty acid salts as described above. Mention may be made, as examples of fatty acid metal salts, of aluminum, calcium, magnesium or zinc stearate. Mention may also be made of aluminum distearate, aluminum tristearate, and the like. Preferably, the fatty acid metal salt is aluminum distearate.

When the lubricant is an aluminum, calcium or zinc stearate, a lubricant other than the stearate is preferably also employed in the process of the invention.

These fatty acids and the fatty acid metal salts may exhibit a chain-limiting effect on the polyamide.

The fatty acid esters which may be suitable in the context of the invention can be esters obtained by reaction between at least one fatty acid defined above and at least one aliphatic fatty alcohol which generally comprises at least 12 carbon atoms. Mention may be made, as examples of fatty alcohols, of lauryl alcohol, myristyl alcohol, palmityl alcohol, stearyl alcohol, eicosyl alcohol, biphenyl alcohol, tetracosyl alcohol, serotinyl alcohol or melissyl alcohol. They can also be ethoxylated fatty alcohols.

According to a specific embodiment of the invention, the lubricant is a mixture of paraffin and of fatty acid and/or of fatty acid metal salt. Preferably, the lubricant is a mixture of paraffin, of fatty acid and of fatty acid metal salt.

According to a particularly preferred embodiment of the invention, the lubricant is a mixture of paraffin and of stearic acid and/or of aluminum distearate. Preferably, the lubricant is a mixture of paraffin, of stearic acid and of aluminum distearate.

Advantageously, the proportion by weight of lubricant with respect to the weight of polyamide is between 0.1 and 5%; it is preferably between 0.2 and 2%.

The lubricant can be introduced in different forms. It can, for example, be introduced in the liquid form, for example when the lubricant is liquid at ambient temperature, or it can be molten.

It can also be introduced in the solid form, for example in the form of a masterbatch.

In the lubricant which is a mixture of several components according to the invention, some components can be in the solid form and others can be in the liquid form.

The lubricant is introduced according to any method known to a person skilled in the art for introducing an additive.

Chain-Limiting Agents

In addition, polyamide-chain-limiting agents can be introduced during the process for the polymerization of the polyamide. Mention may be made, as examples of chain-limiting agents, of:

monocarboxylic acids,
dicarboxylic acids,
metal salts of mono- or dicarboxylic acids,
monoamines,
diamines, one of the functional groups of which is hindered (HALS), and
their mixtures.

Preferably, the chain-limiting agents according to the invention are chosen from acetic acid, benzoic acid, lauric acid, propionic acid, benzylamine, n-hexadecylamine, n-octadecylamine and n-dodecylamine, and 4-amino-2,2,6,6-tetramethylpiperidine.

The present invention is also targeted at injection-molded articles obtained by use of a lubricated polyamide as described above, said articles generally being filler-free molded articles, in particular cable ties, connectors, valves, electronic or electrical keys, fixing components, such as fasteners, clamps, clips, and the like.

Other details or advantages of the invention will become more clearly apparent in the light of the examples given below.

EXAMPLES

1. Preparation of the Polyamides

Control Polyamide: Lubricant Introduced after the Finisher

A nylon salt solution is introduced into an evaporator, where a portion of the water is removed. The thus concentrated solution of nylon salt subsequently feeds a horizontal-axis reactor heated to 250° C. by virtue of a heat-exchange fluid. The polycondensation reaction is carried out and forms a prepolymer still comprising water, which it is a matter of removing. The prepolymer is subsequently sent to a flasher and is heated up to 280° C. A mixture of prepolymer and steam is formed and is directed to a horizontal finisher, where the separation of the steam and the prepolymer takes place and where the reaction continues.

The finisher is stirred and heated to 280° C. by a heat-exchange fluid. A gear pump subsequently transfers the lubricated polymer to a die block. The rods which exit from the die are cooled and cut up through a granulation system.

A lubricant mixture comprising liquid paraffin, also known as "white mineral oil" (CAS number 8042-47-5), stearic acid and aluminum distearate is introduced upstream of the gear pump placed after the finisher, this being done a few tens of seconds (from 10 to 30 seconds) before the granulation stage.

Polyamide According to the Invention: Lubricant Introduced During the Polymerization Process:

A nylon salt solution is introduced into an evaporator, where a portion of the water is removed. The thus concentrated solution of nylon salt subsequently feeds a horizontal-axis reactor heated to 250° C. by virtue of a heat-exchange fluid. The polycondensation reaction is carried out and forms a prepolymer still comprising water, which it is a matter of removing. The prepolymer is subsequently sent to a flasher and is heated up to 280° C. A mixture of prepolymer and steam is formed and is directed to a horizontal finisher, where the separation of the steam and the prepolymer takes place and where the reaction continues.

A lubricant mixture comprising liquid paraffin, also known as "white mineral oil" (CAS number 8042-47-5), stearic acid and aluminum distearate is introduced through an opening situated above the horizontal finisher, at the inlet of the finishing device.

By virtue of a gear pump, the lubricated polymer is transferred to a die block. The rods which exit from the die are cooled and cut up through a granulation system.

The granules of the control polyamide and of the polyamide according to the invention are placed in a dry air dryer for a minimum of 4 hours at a temperature of 80° C. Moisture content of the granules after drying=0.11%.

2. Measurement of the Viscosity Index Before Molding

The first test is the measurement of the viscosity index according to the standard ISO307, which uses the measurement of the flow times, at 25° C., of a solution of polyamide at a content by weight of 5 g/l in 90% formic acid. These tests are carried out starting from the dried granules. The results are given in table 2 below.

3. Injection Molding of the Parts

Cable ties with a length of 390 mm are molded on a machine having 16 cavities in the mold and having a clamping force of 320 tonnes. The starting point is the molding of the control test (molding starting from the control polyamide prepared above) at an injection temperature of 320° C. The moldings for each of tests 1 to 3 (moldings starting from the polyamide according to the invention prepared above) are continued, the injection temperature for tests 2 and 3 being reduced, as given in table 1 below. 200 to 300 ties are withdrawn for the subsequent breaking tests and for the measurement of the viscosity index after molding.

4. Measurement of the Viscosity Index after Molding

The same method is applied as that described above in point 2 for measurement of the viscosity index. This method corresponds to the standard ISO307, which uses the measurement of the flow times, at 25° C., of a solution of polyamide at a content by weight of 5 g/l in 90% formic acid. These tests are carried out starting from the injection-molded parts. The results are given in table 2 below.

5. Measurement of the Degree of Nonbreaking at Ambient Temperature (23° C.)

A sample of 50 ties molded according to the process described above is taken. Of the 50 ties, 25 ties are taken heads at the bottom and 25 ties are taken heads at the top. It is subsequently monitored that the heads of the ties allow them to be fitted (passage of the tape into the head). The test is carried out 24 hours after molding, the samples having been deposited in the climate-controlled chamber at 23° C. after molding.

The Test of Breaking at the Head

This test consists in passing all of the tape of the tie through its head with a dry and rapid movement until the tie arrives at the stop.

If the tape does not break at the level of the head of the tie, then the latter is counted in the "Nonbreaking at the head" column. Then, with this same tie, the test of breaking at the tape is carried out.

If the tape breaks at the level of the head of the tie, the test of breaking at the tape is carried out.

The Test of Breaking at the Tape

This test consists in bending the tape at five different points distributed over its entire length, the teeth for holding the head toward the outside of the bend (which bending is the most unfavorable to the performance of the tape).

If the tape does not break after these five bendings and if it has not broken at the head either, then the tie will be counted in the "Nonbreaking at the tape and at the head" column.

If the tape does not break but if the head has broken during the preceding test, then the tie is counted in the "Nonbreaking at the tape" column.

If the tape breaks and if the head of the tie has not broken during the preceding test, the tie is categorized in the "Nonbreaking at the head" column.

If the tie breaks at the tape and at the head, it is not counted in the preceding categories (Nonbreaking . . . ).

During the expression of the results of % Nonbreaking in table 1, the following calculation is carried out:

% Nonbreaking at the head and at the tape=% Nonbreaking at the tape*% Nonbreaking at the head/100

6. Results of the Tests

TABLE 1

Results of the tests of nonbreaking

|  | T injection molding (° C.) | P injection molding (bars) | P maintenance (bars) | % Nonbreaking at the head and at the tape |
|---|---|---|---|---|
| Control | 320° C. | 150 | 85 | 92 |
| Test 1 | 320° C. | 143 | 65 | 86 |
| Test 2 | 315° C. | 145 | 80 | 88 |
| Test 3 | 310° C. | 146 | 85 | 90 |

The cycle time for all of the tests is 9 s.

TABLE 2

Results of the tests for measurement of the viscosity index

| Products | VI before molding/VI after molding |
|---|---|
| Control | 136/127 |
| Test 1 | 119/113 |
| Test 2 | 119/117 |
| Test 3 | 119/119 |

7. Conclusion

It emerges from table 1 that the tests according to the invention make it possible to reduce the injection-molding temperature by up to 10° C. in comparison with the control test, while retaining good mechanical properties (expressed by the % of nonbreaking). In addition, table 3 shows that the tests according to the invention exhibit, on the one hand, a viscosity index before molding which is markedly lower than that of the control test, which reflects the fluidity of the polymer before injection molding and thus its ability to produce more or less complex shapes, and, on the other hand, a viscosity index after molding which is close to the viscosity index before molding, still in comparison with the control test. This slight difference between the viscosity index before molding and after molding reflects the fact that, according to the invention, it is possible, while lowering the injection-molding temperature, to retain good mechanical properties with regard to the parts obtained.

The polymer according to the invention thus makes it possible to have a good compromise between the characteristics of ease of implementation of the molding by injection of more or less complex shapes and the production of molded parts having good mechanical properties. Furthermore, for the polymer according to the invention, the injection-molding temperature can be reduced while retaining the cycle time of the plant, which constitutes a significant saving in energy from the industrial viewpoint.

The invention claimed is:

1. A method of preparing an article, the method comprising:
    manufacturing a polyamide by a polymerization process comprising a phase of distillation under pressure, a decompression phase, a finishing phase comprising a finisher, and a granulation phase;
    wherein the polyamide is a polyamide of 6 or 66 type and exhibits a viscosity index, measured according to the standard ISO307, of from 95 ml/g to 125 ml/g;
    introducing a lubricant, and optionally a chain-limiting agent, during the process for the polymerization of the polyamide, in the following way:
        if the chain-limiting agent is introduced during the process for the polymerization of the polyamide, then said chain-limiting agent is introduced before the end of the finishing stage, and
        the lubricant is introduced after the phase of distillation under pressure and before the end of the finisher; and
    injection molding the article using the lubricated polyamide.

2. The method as defined in claim 1, wherein the polyamide exhibits a viscosity index, measured according to the standard ISO307, of from 105 ml/g to 125 ml/g.

3. The method as defined in claim 2, wherein the polyamide exhibits a viscosity index of from 110 ml/g to 122 ml/g.

4. The method as defined in claim 1, wherein the lubricant is a paraffin, the mean number of carbon atoms of which is from 8 to 100.

5. The method as defined in claim 4, wherein the mean number of carbons is from 12 to 80.

6. The method as defined in claim 4, wherein the mean number of carbons is from 15 to 50.

7. The method as defined in claim 1, wherein the lubricant is selected from the group consisting of a fatty acid, a fatty acid metal salt, a fatty acid ester, a fatty acid amide and a mixture thereof.

8. The method as defined in claim 7, wherein the fatty acid is a stearic acid.

9. The method as defined in claim 7, wherein the fatty acid metal salt is aluminum distearate.

10. The method as defined in claim 1, wherein the lubricant is a mixture of paraffin and of fatty acid and/or of fatty acid metal salt.

11. The method as defined in claim 10, wherein the lubricant is a mixture of paraffin, of a fatty acid and of a fatty acid metal salt.

12. The method as defined in claim 1, wherein the lubricant represents from 0.1% by weight to 5% by weight, with respect to the weight of polyamide.

13. The method as defined in claim 1, wherein the polyamide is obtained by a process comprising a phase of concentrating the N salt or a stage of mixing the monomers with water, a phase of distillation under pressure and a decompression phase, and in that the lubricant is introduced after the stage of distillation under pressure and before the end of the finisher.

14. The method as defined in claim 13, wherein the lubricant is introduced after the decompression stage.

15. The method as defined in claim 13, wherein the lubricant is introduced between the beginning and the end of the finisher.

16. The method as defined in claim 13, wherein a chain-limiting agent is added during the process for the polymerization of the polyamide.

17. The method as defined in claim 16, wherein the chain-limiting agent is selected from the group consisting of acetic acid, benzoic acid, lauric acid, propionic acid, benzylamine, n-hexadecylamine, n-octadecylamine and n-dodecylamine, and 4-amino-2,2,6,6-tetramethylpiperidine.

18. The method as defined in claim 16, wherein the chain-limiting agent is introduced before or during the phase of concentrating the N salt or during the stage of mixing the monomers with water.

19. The method as defined in claim 1, wherein the chain-limiting agent is selected from the group consisting of:
- a monocarboxylic acid,
- a dicarboxylic acid,
- a metal salt of a monocarboxylic acid,
- a metal salt of a dicarboxylic acid,
- a monoamine,
- a diamines, one of the functional groups of which is hindered, and
- a mixture thereof.

20. The method as defined in claim 1, wherein the polyamide, when the lubricant is introduced, is not subjected to a remelting stage.

21. The method as defined in claim 1, wherein the lubricant is introduced through an inlet of the finisher.

22. The method as defined in claim 1, wherein the lubricant is a liquid at ambient temperature.

23. The method as defined in claim 1, wherein the lubricant and the chain-limiting agent are combined to form a mixture and the mixture is introduced after the phase of distillation under pressure and before the end of the finisher.

* * * * *